(12) United States Patent
Zafra-Petersson et al.

(10) Patent No.: US 8,547,134 B1
(45) Date of Patent: Oct. 1, 2013

(54) ARCHITECTURE FOR HIGH SPEED SERIAL TRANSMITTER

(75) Inventors: Axel Zafra-Petersson, Foios (ES); Johan H. Mansson, Puzol (ES); Michael R. Elliott, Summerfield, NC (US); Brad P. Jeffries, Browns Summit, NC (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 13/556,381

(22) Filed: Jul. 24, 2012

(51) Int. Cl.
| | |
|---|---|
| H03K 17/16 | (2006.01) |
| H03K 19/003 | (2006.01) |
| H03K 19/094 | (2006.01) |
| H03K 3/00 | (2006.01) |
| H03B 1/00 | (2006.01) |

(52) U.S. Cl.
USPC .............................. 326/30; 326/83; 327/109

(58) Field of Classification Search
USPC ................... 326/30, 82, 83, 86, 87; 327/108, 327/109
See application file for complete search history.

(56) References Cited

U.S. PATENT DOCUMENTS

| | | | | |
|---|---|---|---|---|
| 4,766,334 A | * | 8/1988 | Warner | 326/56 |
| 5,530,377 A | * | 6/1996 | Walls | 326/30 |
| 2010/0262747 A1 | * | 10/2010 | Gaskins et al. | 710/311 |

OTHER PUBLICATIONS

Menolfi et al., 2007 IEEE International Solid-State Circuits Conference, "A 16Gb/s Source-Series Terminated Transmitter in 65nm CMOS S01", pp. 446-447.
Cao et al., 2002, "OC-192 Transmitter and Receiver in Standard 0.18-μm CMOS", IEEE Journal of Solid-State Circuits, 37(12):1768-1780.

* cited by examiner

*Primary Examiner* — Shawki Ismail
*Assistant Examiner* — Dylan White
(74) *Attorney, Agent, or Firm* — Kenyon & Kenyon LLP

(57) ABSTRACT

A system provides for a serial transmitter with multiplexing and driving functionality that is combined into a single stage to increase the overall speed of the serial transmitter. The single stage includes a dynamic impedance that is configured in parallel with a multiplexing driver to reduce the input capacitance and set the correct output impedance. The single stage can be implemented as a stacked or cross-coupled XOR logic circuit or a stacked or cross-coupled multiplexer ("mux") as the multiplexing driver. In an embodiment where a mux is used as the multiplexing driver, a clock can be injected into the mux driver to overcome inter-symbol interference.

27 Claims, 7 Drawing Sheets

ARCHITECTURE FOR HIGH SPEED SERIAL TRANSMITTER

FIELD OF THE INVENTION

The present invention relates to an architecture for a high speed serial transmitter with multiplexing functionality. The present invention relates to a high speed serial transmitter that combines multiplexing and driving functionality into a single stage. The present invention further relates to a single stage serial transmitter using a dynamic impedance to reduce input capacitance. The present invention further relates to a single stage current mode driver using multiplexing functionality in conjunction with a dynamic impedance.

BACKGROUND INFORMATION

Serial transmitters allow for the transmission of data sequentially by bit, over a given channel. As fast data conversion is often a necessity, high speed serial transmitters must be implemented to achieve various speed requirements. A serial transmitter may consist of, for example, a serializer in one stage followed by a driver component in another stage. A common implementation of constructing a serializer can be made by combining partial stream bit streams, such as a half bit stream, through a multiplexer to achieve the full speed bit rate. However, the speed of the serial transmitter is affected by the implementation of the serializer and the driver component, since the speed of the serial transmitter is dominated by the circuit implementation and design choice.

The speed of the serial interface is dominated by two circuits that are tied together in their design choices. The output driver and the final 2:1 multiplexer dominate the speed limitations as all circuits prior to this node operate at half the data rate. The driver itself not only creates a speed bottleneck but also sets the load for the final mux stage. The final mux stage creates also a speed bottleneck in the physical layer, which may be more serious than the actual output driver because of the load set by the driver.

Previous implementations to remove and/or overcome the unwanted effects of the speed bottlenecks produced by the individual components in a serial transmitter focused on using a dynamic load as an output driving component. Such an implementation however, required the serial transmitter to be driven with a current mode pre-driver that necessitated the use of large input devices to drive a dynamic load. This requirement could be alleviated by driving the serial transmitter with a CMOS inverter, but implementing a CMOS multiplexer, for example, and buffering its output to drive a pre-driver creates its own undesirable speed bottleneck and inter-symbol interference ("ISI").

Thus there remains a need in the art, for a high speed serial transmitter that can overcome the speed limitations of its individual components. There further remains a need in the art for an efficient, high speed current mode driver that can combine a driver with multiplexing functionality in a single stage while operating at lower power.

SUMMARY OF THE INVENTION

A system and method are described herein that provide for a serial transmitter with multiplexing and driving functionality that is combined into a single stage to increase the overall speed of the serial transmitter. The single stage includes a dynamic impedance that is configured in parallel with a multiplexing driver to reduce the input capacitance by setting the correct output impedance. The multiplexing driver can be implemented as a stacked or cross-coupled XOR driver or a stacked or cross-coupled multiplexer ("mux"). In an embodiment where a mux is used as the multiplexing driver, a clock can be injected into the mux driver to overcome inter-symbol interference.

In particular, the exemplary embodiments and/or exemplary methods of the present invention are directed to a high speed serial transmitter having at least one driver and at least one dynamic impedance connected in parallel. The dynamic impedance may be made up of an inverter and a resistor connected to an input and an output of the inverter. In the serial transmitter, the driver and the dynamic impedance may be contained in a single stage of the serial transmitter. The serial transmitter may include an additional driver to drive the dynamic impedance. The inverter in the dynamic impedance may be a CMOS inverter.

The multiplexing driver can be a XOR driver that is implemented via a XOR logic circuit. This XOR logic circuit can provide multiplexing functionality and can be arranged in a stacked architecture or in a cross-coupled architecture. The multiplexing driver can also be implemented as a multiplexer. The multiplexer can be implemented in a stacked architecture or in a cross-coupled architecture. Regardless of whether a XOR driver or a multiplexer is used as a multiplexing driver, the driver can receive half bit rate inputs, rather than full bit rate inputs.

The exemplary embodiments and/or exemplary methods of the present invention are directed to a high speed serial transmitter that includes a first XOR driver or multiplexer depending on the selection of the multiplexing driver, at least one dynamic impedance connected in parallel to the first XOR driver or multiplexer, and a second XOR driver or multiplexer connected to the dynamic impedance, where the second XOR driver or multiplexer drives the dynamic impedance. The selection of the second XOR driver or multiplexer may be in accordance with the first multiplexing driver.

The first XOR driver or multiplexer, the dynamic impedance, and the second XOR driver or multiplexer may all be arranged in a single stage of the serial transmitter. If a multiplexer is used for the multiplexing drivers, a clock function can be injected into the first and second multiplexers to selectably control them.

The first XOR driver or multiplexer in the serial transmitter may include at least one pMOS device operating as a current source, and a plurality of nMOS devices to receive the half bit rate inputs and to sink the current from the current source. In the embodiment where a multiplexer is used, an nMOS device may be implemented to receive the injected clock functions, to selectably control the multiplexer.

The second XOR driver or multiplexer in the serial transmitter may also include at least one pMOS device operating as a current source, and a plurality of nMOS devices to receive the half bit rate inputs and to sink the current from the current source. In the embodiment where a multiplexer is used, an nMOS device may be implemented to receive the injected clock functions, to selectably control the second multiplexer.

DETAILED DESCRIPTION

The subject invention will now be described in detail for specific preferred embodiments of the invention, it being understood that these embodiments are intended only as illustrative examples and the invention is not to be limited thereto.

The present invention provides a serial transmitter with multiplexing and driving functionality combined into a single stage to increase the overall speed of the serial transmitter. The single stage includes a dynamic impedance that is configured in parallel with a multiplexing driver to reduce the input capacitance and set the correct output impedance. The input capacitance may be reduced because the output driver may have a high output impedance. The single stage can be implemented as a stacked or cross-coupled XOR logic circuit or a stacked or cross-coupled multiplexer ("mux") as the multiplexing driver. In an embodiment where a mux is used as the multiplexing driver, a clock can be injected into the mux driver to overcome inter-symbol interference.

Figure 1:
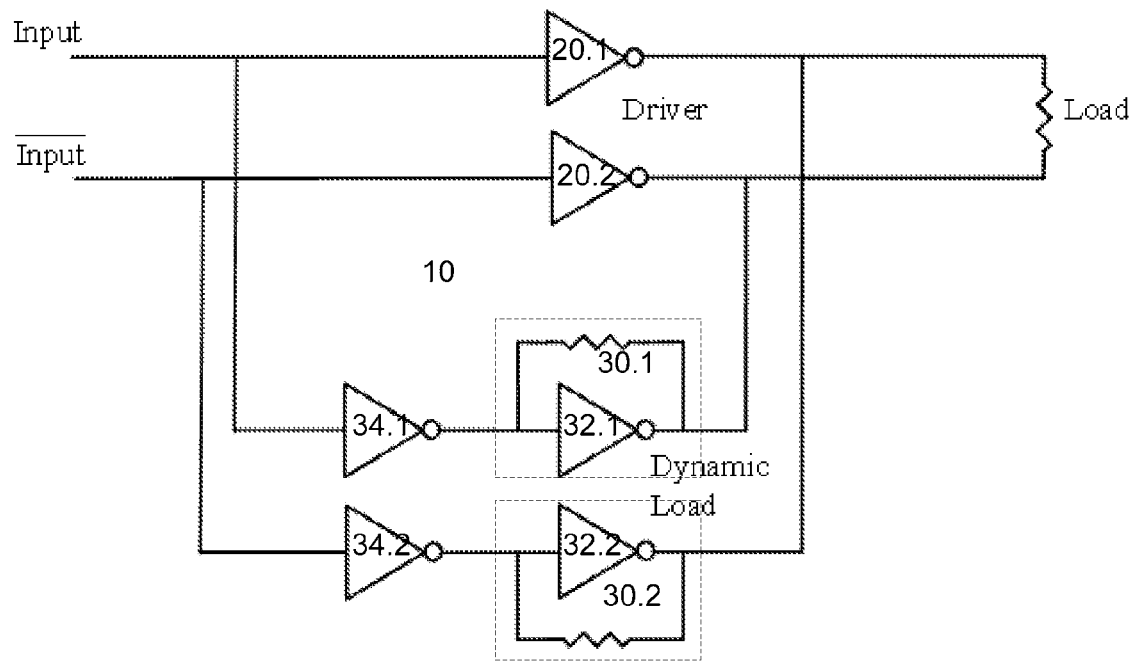
FIG. 1 is a diagram of a serial transmitter with an output driver in parallel with a dynamic impedance according to an embodiment of the present invention.

FIG. 1 illustrates an embodiment of a stage of a serial transmitter 10 with an output driver in parallel with a dynamic impedance. Serial transmitter 10 may include one or more drivers 20.1, 20.2. In the example embodiment in FIG. 1, two full bit streams may be input to the serial transmitter 10. One input may correspond to a selected input signal, while the other input may correspond to an inversion of the input signal. In FIG. 1, each of the drivers may receive an input from an earlier stage of the serial transmitter which may be implemented with CMOS logic. Driver 20.1 may receive an input, while driver 20.2 may receive the inverted input, $\overline{input}$. The outputs of the drivers may be connected to some external load.

Each driver in the stage of the serial transmitter 10 may be connected to a dynamic impedance 30.1, 30.2 and the dynamic impedances may be placed in parallel to the drivers. Dynamic impedances 30.1, 30.2 may also allow for the reduction in the size of the device elements in serial transmitter 10, particularly the size of the drivers 20.1, 20.2, because the output impedance may be set by the dynamic impedance and not the driver. The presence of dynamic impedance 30.1, 30.2, may allow for the input capacitance of serial transmitter 10 to be reduced.

The dynamic impedances 30.1, 30.2, embodied in FIG. 1 may include an inverter 32.1, 32.2 that is connected at its output and input by a resistor. In an embodiment, inverter 32.1, 32.2, may be implemented with CMOS devices. The CMOS inverter may be scaled to a particular size to achieve the required output impedance. An input terminal of the CMOS inverter may be connected to a resistor, with the output terminal of the CMOS inverter also being connected to the resistor.

Each of the dynamic impedances 30.1 and 30.2 may be connected to an inverter 34.1 and 34.2. In the embodiment of FIG. 1, dynamic impedance 30.1 may be connected to an output of inverter 34.1, where the output of inverter 34.1 is connected to one end of the resistor and to the input of CMOS inverter 32.1. Dynamic impedance 30.2 may be connected to an output of inverter 34.2, where the output of inverter 34.2 is connected to one end of the resistor and to the input of CMOS inverter 32.2.

Inverters 34.1, 34.2 may be used to drive the dynamic impedances 30.1, 30.2. In an embodiment, inverters 34.1, 34.2 may be CMOS inverters. Inverter 34.1 may receive the same input signal as driver 20.1. Inverter 34.1 may output a signal to dynamic impedance 30.1 that may correspond to an inversion of the input, $\overline{input}$. Similarly, inverter 34.2 may receive $\overline{input}$ like driver 20.2 and may output a signal to dynamic impedance 30.2 that may correspond to the input signal.

Each of the dynamic impedances 30.1, 30.2, may also be connected to an output of one of the drivers. In an example embodiment, dynamic impedance 30.1 may be connected to the output of driver 20.2. In this embodiment, the output of driver 20.2 may be connected to the output of CMOS inverter 32.1 and to the other end of the connecting resistor. Dynamic impedance 30.2 may be connected to the output of driver 20.1. The output of driver 20.1 may be connected to the output of CMOS inverter 32.2 and to the other end of the connecting resistor. The outputs of dynamic impedance 30.1 and dynamic impedance 30.2 may correspond to the outputs of the serial transmitter. In an embodiment, the outputs of the serial transmitter may be connected to some external load.

The presence of the dynamic impedance may allow for the drivers 20.1 and 20.2 to be reduced in size. This may subsequently have the affect to allow for a higher speed at the output by the one or more drivers without a distorted output impedance. The output current may be produced directly by the drivers, as no current to drive the load is produced by the dynamic impedances 30.1, 30.2.

Figure 2:
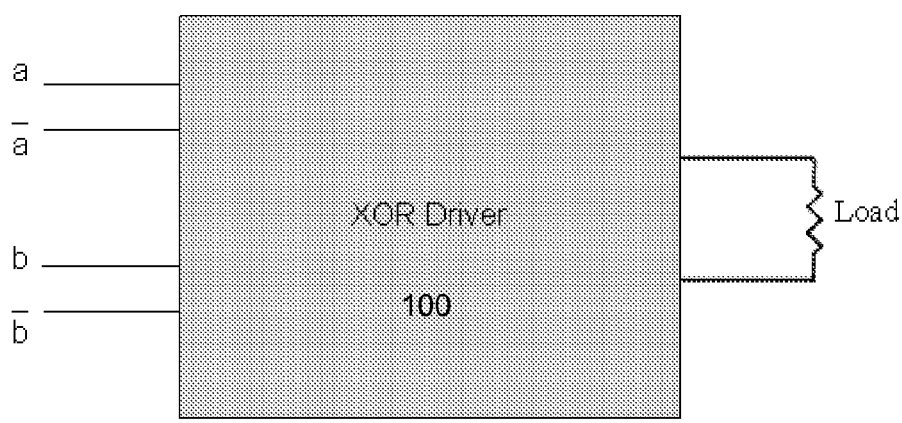
FIG. 2 is a diagram of a XOR driver connected to a load that operates as a multiplexing driver with inputs running at half rate according to an embodiment of the present invention.

FIG. 2 illustrates a diagram of a XOR driver, connected to an external load, that operates as a multiplexing driver with inputs running at half rate according to an embodiment of the present invention. In the embodiment in FIG. 2, the drivers 20.1, 20.2, may be implemented with a XOR driver 100 using a XOR logic gate configuration. Multiplexing by the XOR driver 100 may be achieved by encoding each data input so that it may only represent a toggle function. In this configuration, the data input may represent whether the output should transition or not, rather than being absolute. Rather than the full rate bit stream input embodied in FIG. 1, the XOR driver 100 in FIG. 2 may receive two pairs of half bit streams. In an embodiment, XOR driver 100 may receive the inputs a and b, and the inverted input signals, $\overline{a}$ and $\overline{b}$.

Figure 3:
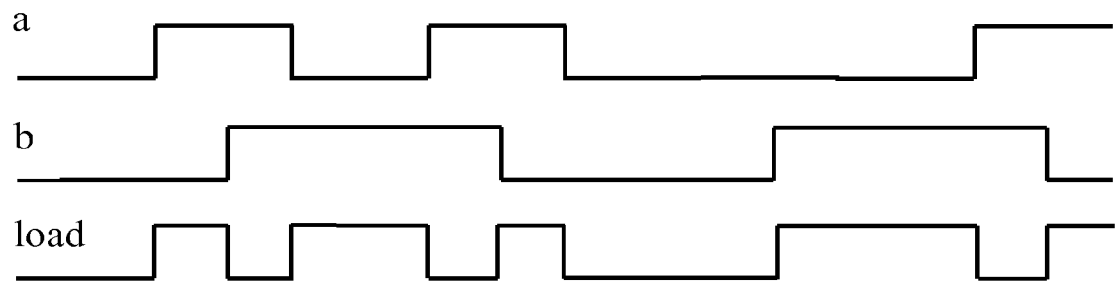
FIG. 3 is an example timing diagram for the inputs and the output of the XOR driver according to an embodiment of the present invention.

In an embodiment, the XOR driver 100 of the serial transmitter may be connected to an external load. XOR driver 100 may implement an "exclusive or" structure, through XOR gate logic. FIG. 3 illustrates a timing diagram for the inputs and the output of the XOR driver according to an embodiment of the present invention. In an embodiment, whereas if only one of a or b is high (1), the output of the serial transmitter may also be high (1). If both a and b are low (0), the output of XOR driver 100 may also be low (0). If both a and b are high (1), the output of XOR driver 100 may still be low (0).

Figure 4:
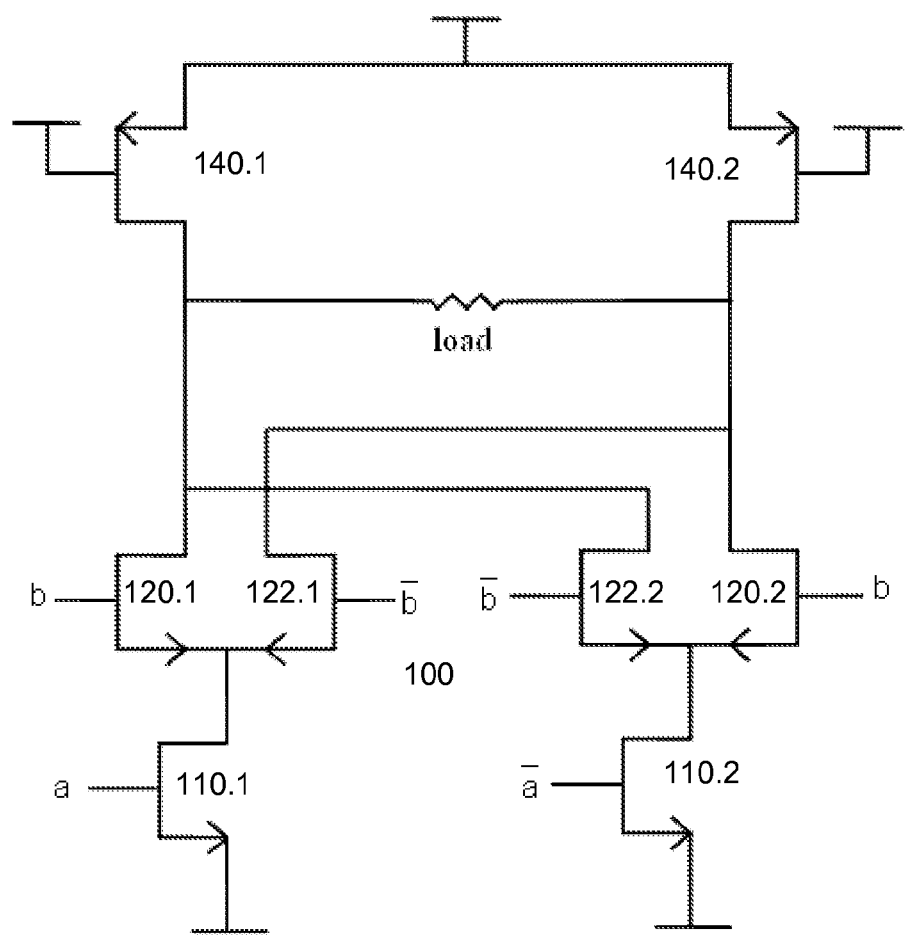
FIG. 4 is a diagram of a schematic for a stacked XOR driver performing multiplexing functionality in a stage of a serial transmitter according to an embodiment of the present invention.

The XOR driver 100 may be implemented in a number of ways. In an embodiment, XOR driver 100 may be implemented using a stacked XOR logic gate architecture. In another embodiment, XOR driver 100 may be implemented using a cross-coupled XOR logic gate architecture. FIG. 4 illustrates a diagram of a schematic for a stacked XOR driver performing multiplexing functionality in a stage of a serial transmitter. XOR driver 100 may include two pMOS devices 140.1, 140.2 which may be implemented as current sources. XOR driver 100 may also include nMOS devices 120.1, 120.2, 122.1, and 122.2. The nMOS devices 120.1 and 122.1 may be connected to nMOS device 110.1. The nMOS devices 120.2 and 122.2 may be connected to nMOS device 110.2.

In an embodiment, the source terminals of pMOS devices 140.1 and 140.2 may be connected. The drain terminal of pMOS device 140.1 may be connected to the drain terminal of nMOS device 120.1 and the drain terminal of nMOS device 122.2. The drain terminal of pMOS device 140.2 may be connected to the drain terminal of nMOS device 122.1 and the drain terminal of nMOS device 120.2.

In an embodiment, the nMOS devices 120.1 and 122.1 may be coupled at their source terminals to the drain terminal of nMOS device 110.1. The nMOS devices 120.2 and 122.2 may be coupled at their source terminals to the drain terminal of nMOS device 110.2. The nMOS device 110.1 may receive input a, while nMOS device 110.2 may receive the inverted input $\bar{a}$. Conversely, nMOS devices 120.1 and 120.2 may both receive input b, while nMOS devices 122.1 and 122.2 may receive the inverted input $\bar{b}$. The nMOS devices 110.1, 110.2, 120.1, 120.2, 122.1, and 122.2 may be scaled to sink twice the current from pMOS devices 140.1 and 140.2. Each of the nMOS devices receives half rate bit streams as inputs. Because the output impedance is set by the dynamic load, small nMOS devices may be used, which are easier to drive, and which may ultimately increase the speed of the serial transmitter.

Figure 5:
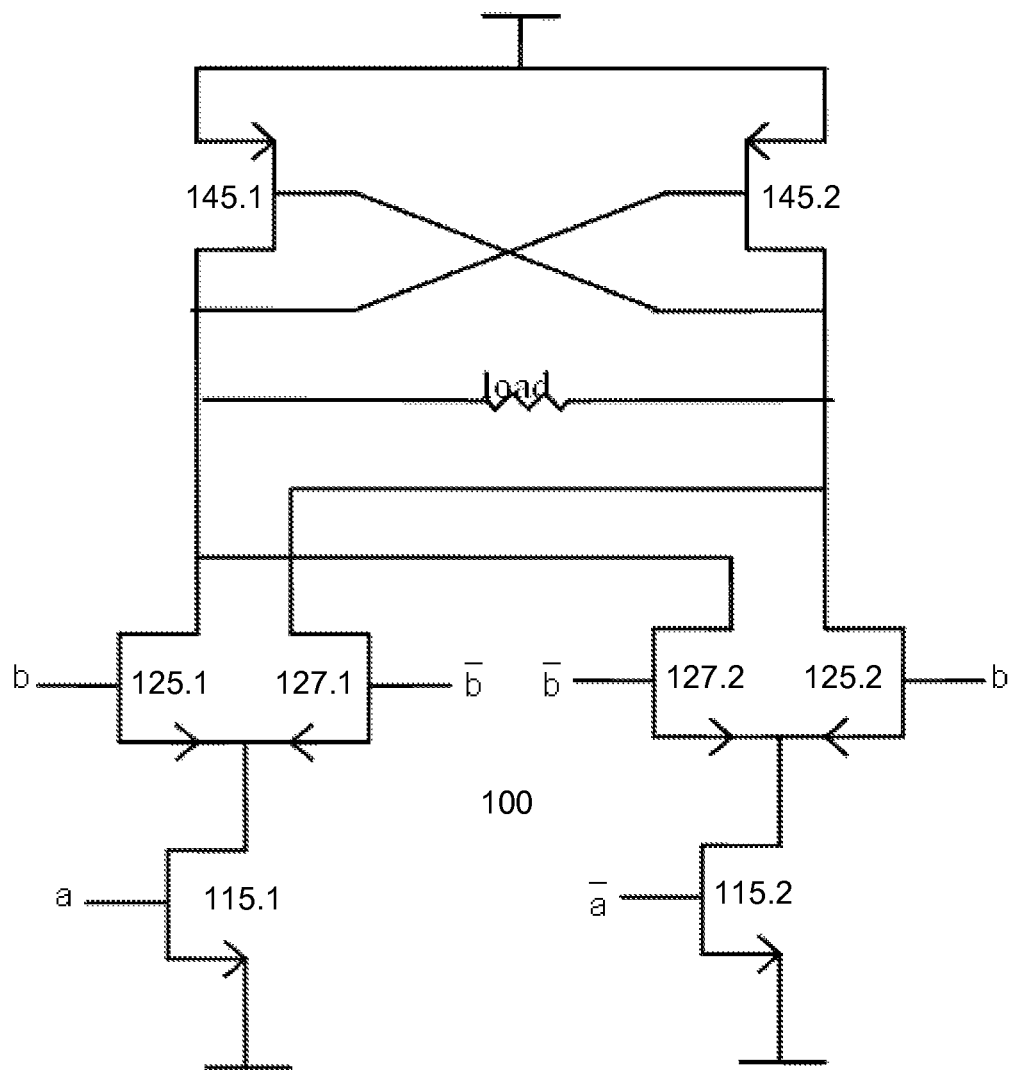
FIG. 5 is a diagram of a schematic for a cross-coupled XOR driver performing multiplexing functionality in a stage of a serial transmitter according to an embodiment of the present invention.

The embodiment in FIG. 4 may lead to the design of very large pMOS devices in XOR driver 100 which may be difficult to implement. FIG. 5 illustrates a diagram of a schematic for a cross-coupled XOR driver performing multiplexing functionality in a stage of a serial transmitter. The embodiment of the XOR driver 100 in FIG. 5 may allow for a cross-coupling configuration that may reduce power without any significant speed loss.

In a cross-coupled architecture, XOR driver 100 may include two pMOS devices 145.1, 145.2 to provide current. XOR driver 100 may also include nMOS devices 125.1, 125.2, 127.1, and 127.2. The nMOS devices 125.1 and 127.1 may be connected to nMOS device 115.1. The nMOS devices 125.2 and 127.2 may be connected to nMOS device 115.2. In an embodiment, the source terminals of pMOS devices 145.1 and 145.2 may be connected.

The pMOS devices 145.1 and 145.2 may also be connected through cross coupling. In the embodiment illustrated in FIG. 5, the gate terminal of pMOS device 145.1 may be connected to the drain terminal of pMOS device 145.2. The gate terminal of pMOS device 145.1 may also be connected to the drain terminals of nMOS devices 127.1 and 125.2.

The gate terminal of pMOS device 145.2 may be connected to the drain terminal of pMOS device 145.1. The gate terminal of pMOS device 145.2 may also be connected to the drain terminals of nMOS devices 125.1 and 127.2.

In an embodiment, the nMOS devices 125.1 and 127.1 may be coupled at their source terminals to the drain terminal of nMOS device 115.1. The nMOS devices 125.2 and 127.2 may be coupled at their source terminals to the drain terminal of nMOS device 115.2. The nMOS device 115.1 may receive input a, while nMOS device 115.2 may receive the inverted input $\bar{a}$. Conversely, nMOS devices 125.1 and 125.2 may both receive input b, while nMOS devices 127.1 and 127.2 may receive the inverted input $\bar{b}$. The nMOS devices 115.1, 115.2, 125.1, 125.2, 127.1, and 127.2 may be scaled to sink twice the current from pMOS devices 145.1 and 145.2. Because the output impedance is set by the dynamic load, small nMOS devices may be used, which are easier to drive, and which may ultimately increase the speed of the serial transmitter.

The implementation of the cross-coupled XOR driver 100 in the serial transmitter 10 may lead to a push-pull topology for the serial transmitter 10 which is more power efficient while maintaining the high speed output.

Figure 6:
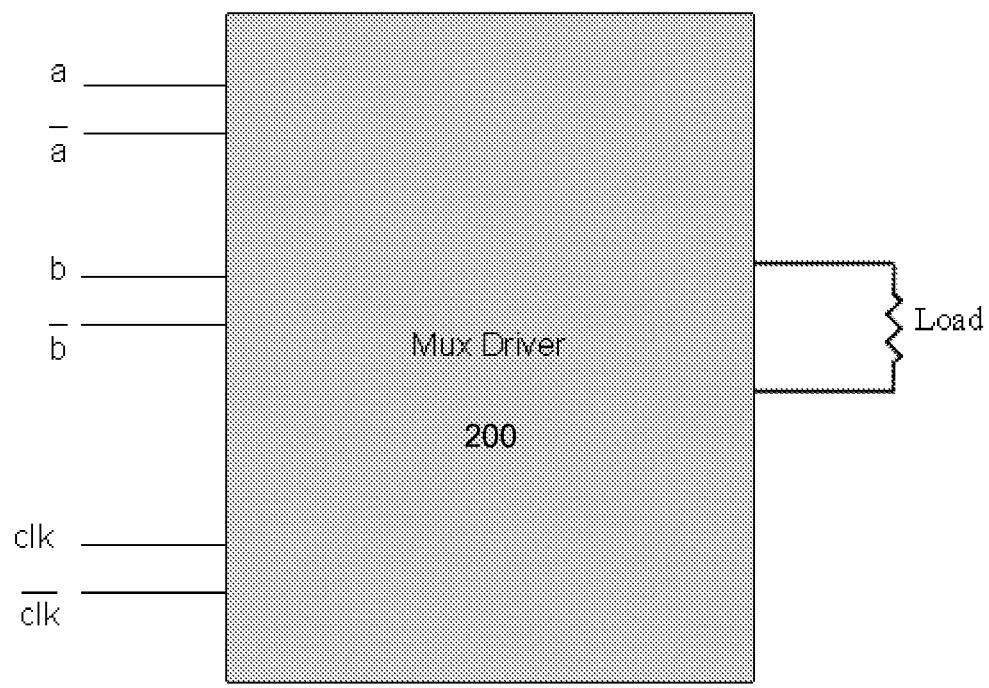
FIG. 6 is a diagram of a multiplexer ("mux") connected to a load with inputs running at half rate according to an embodiment of the present invention.

FIG. 6 illustrates a diagram of a multiplexer ("mux"), connected to an external load, that operates as a multiplexing driver with inputs running at half rate according to an embodiment of the present invention. In the embodiment in FIG. 6, the drivers 20.1, 20.2, may be implemented with a mux driver 200, rather than using XOR driver 100. Mux driver 200 may be any interchangeable multiplexer. Mux driver 200 may be coded in such a manner that the clock may determine when the output is to change. This may create the benefit that the input data does not have to be perfectly aligned. Using a multiplexer to perform the multiplexing functionality may have the benefit that it reduces inter-symbol interference over the configuration where the XOR driver 100 is configured to perform the multiplexing functionality.

The mux driver 200 in FIG. 6 may receive two pairs of half bit streams. In an embodiment, mux driver 200 may receive the inputs a and b, and the inverted input signals, $\bar{a}$ and $\bar{b}$. Certain devices in the circuit architecture of the mux driver 200 may directly receive a clock as its input. The inputted clock may determine when the output is to change. Mux driver 200 may receive a clock input, clk, as well as the inversion of the clock input, $\overline{clk}$.

Figure 7:
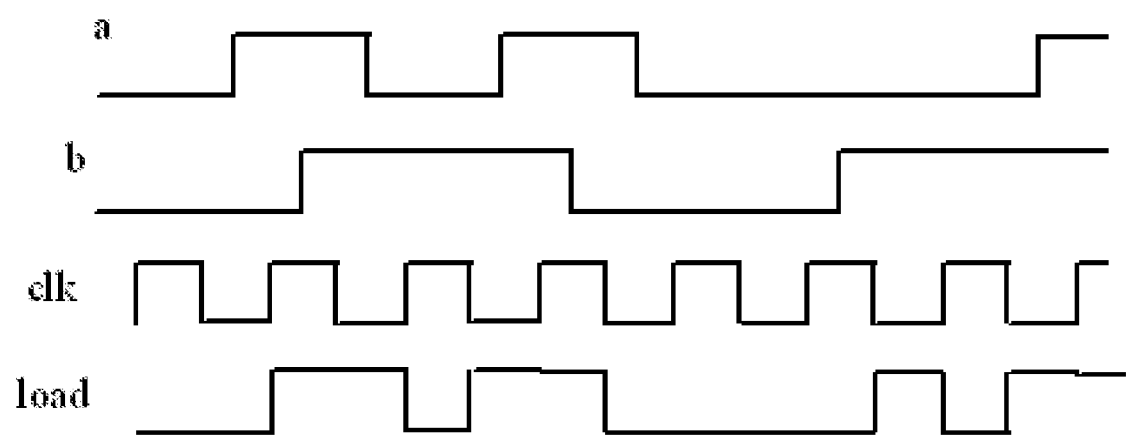
FIG. 7 is an example timing diagram for the inputs, the clock, and the output of the mux driver according to an embodiment of the present invention.

In an embodiment, the mux driver 200 may be connected to some external load. FIG. 7 illustrates a timing diagram for the inputs, the clock, and an output at a load of mux driver 200. If both a and b are low (0), the output may be low (0), regardless of whether the clock is at high or not. If a is low (0), but b is high (1), the output will may be low (0) if the clock is high (1), but may be high (1) if the clock is low (0). If a is high (1), but b is low (0), the output will may be low (0) if the clock is low (0), but may be high (1) if the clock is high (1). If a and b are both high (1), the output will be high (1) regardless of the clock.

Figure 8:
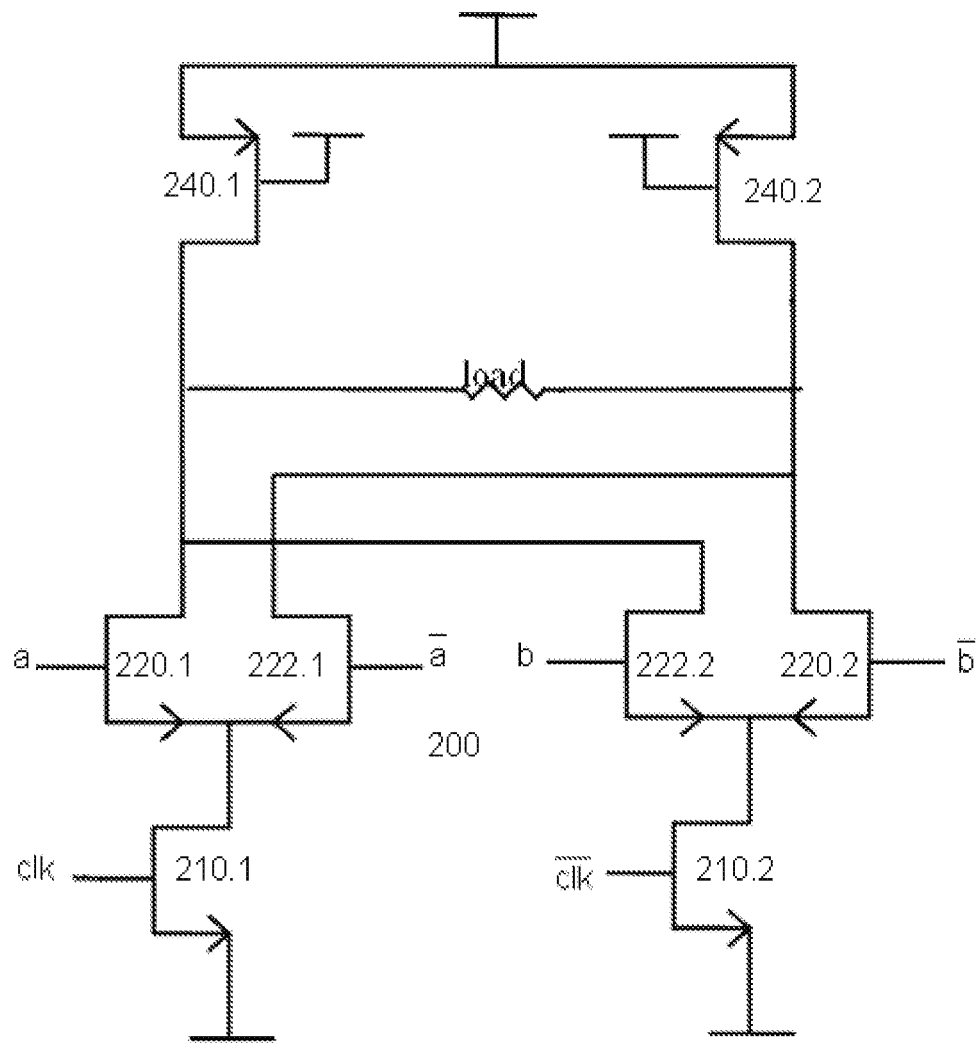
FIG. 8 is a diagram of a schematic for a stacked mux driver in a stage of a serial transmitter according to an embodiment of the present invention.

The mux driver 200 may be implemented in a number of ways. In an embodiment, mux driver 200 may be implemented using a stacked multiplexer architecture. In another embodiment, mux driver 200 may be implemented using a cross-coupled architecture. FIG. 8 illustrates a diagram of a schematic for a stacked mux driver in a stage of a serial transmitter according to an embodiment of the present invention. Mux driver 200 may include two pMOS devices 240.1, 240.2 which may be implemented as current sources. Mux driver 200 may also include nMOS devices 220.1, 220.2, 222.1, and 222.2. The nMOS devices 220.1 and 222.1 may be connected to nMOS device 210.1. The nMOS devices 220.2 and 222.2 may be connected to nMOS device 210.2.

In an embodiment, the source terminals of pMOS devices 240.1 and 240.2 may be connected. The drain terminal of pMOS device 240.1 may be connected to the drain terminal of nMOS device 220.1 and the drain terminal of nMOS device 222.2. The drain terminal of pMOS device 240.2 may be connected to the drain terminal of nMOS device 222.1 and the drain terminal of nMOS device 220.2.

In an embodiment, the nMOS devices 220.1 and 222.1 may be coupled at their source terminals to the drain terminal of nMOS device 210.1. The nMOS devices 220.2 and 222.2 may be coupled at their source terminals to the drain terminal of nMOS device 210.2. The nMOS device 210.1 may be directly injected with the clock, clk, while nMOS device 210.2 may receive the inverted clock input $\overline{clk}$. Conversely, nMOS device 220.1 may receive the input signal a and nMOS device 222.2 may receive the input signal b. The nMOS device 222.1 may receive the inverted input $\overline{a}$ and nMOS device 220.2 may receive the inverted input $\overline{b}$. The nMOS devices 210.1, 210.2, 220.1, 220.2, 222.1, and 222.2 may be scaled to sink twice the current from pMOS devices 240.1 and 240.2. Because the output impedance is set by the dynamic load, small nMOS devices may be used, which are easier to drive, and which may ultimately increase the speed of the serial transmitter.

Figure 9:
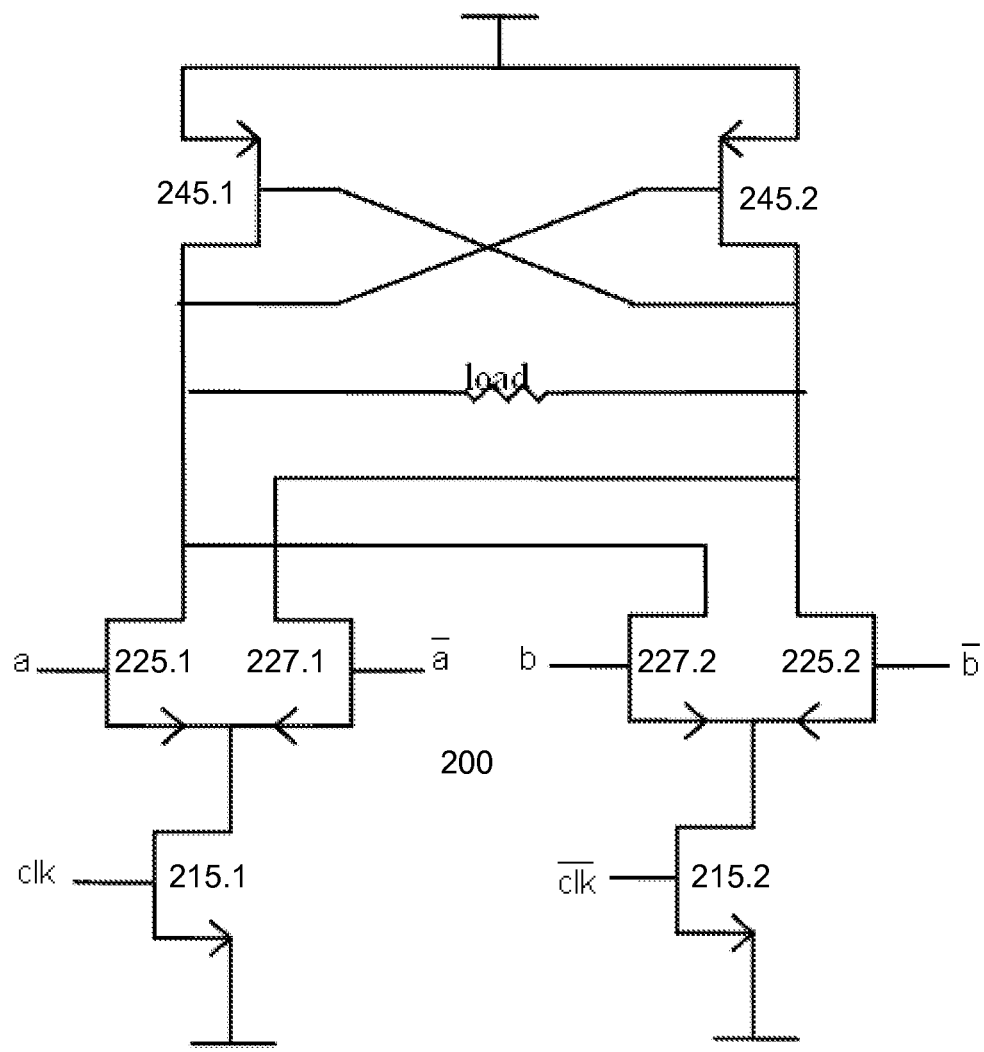
FIG. 9 is a diagram of a schematic for a cross-coupled mux driver in a stage of a serial transmitter according to an embodiment of the present invention.

The embodiment in FIG. 8 may lead to the design of very large pMOS devices in mux driver 200 which may be difficult to implement. FIG. 9 illustrates a diagram of a schematic for a cross-coupled mux driver in a stage of a serial transmitter according to an embodiment of the present invention. The embodiment of the mux driver 200 in FIG. 9 may allow for a cross-coupling configuration that may reduce power without any significant speed loss.

In a cross-coupled architecture, mux driver 200 may include two pMOS devices 245.1, 245.2 which provide current. Mux driver 200 may also include nMOS devices 225.1, 225.2, 227.1, and 227.2. The nMOS devices 225.1 and 227.1 may be connected to nMOS device 215.1. The nMOS devices 225.2 and 227.2 may be connected to nMOS device 215.2. In an embodiment, the source terminals of pMOS devices 245.1 and 245.2 may be connected.

The pMOS devices 245.1 and 245.2 may also be connected through cross coupling. In the embodiment illustrated in FIG. 9, the gate terminal of pMOS device 245.1 may be connected to the drain terminal of pMOS device 245.2. The gate terminal of pMOS device 245.1 may also be connected to the drain terminals of nMOS devices 227.1 and 225.2.

The gate terminal of pMOS device 245.2 may be connected to the drain terminal of pMOS device 245.1. The gate terminal of pMOS device 245.2 may also be connected to the drain terminals of nMOS devices 225.1 and 227.2.

In an embodiment, the nMOS devices 225.1 and 227.1 may be coupled at their source terminals to the drain terminal of nMOS device 215.1. The nMOS devices 225.2 and 227.2 may be coupled at their source terminals to the drain terminal of nMOS device 215.2. The nMOS device 215.1 may be directly injected with the clock, clk, while nMOS device 215.2 may receive the inverted clock input $\overline{clk}$. Conversely, nMOS device 225.1 may receive the input signal a and nMOS device 227.2 may receive the input signal b. The nMOS device 227.1 may receive the inverted input $\overline{a}$ and nMOS device 225.2 may receive the inverted input $\overline{b}$.

The implementation of the cross-coupled mux driver 200 in the serial transmitter 10 may lead to a push-pull topology for the serial transmitter 10 which is more power efficient while maintaining the high speed output.

Figure 10:
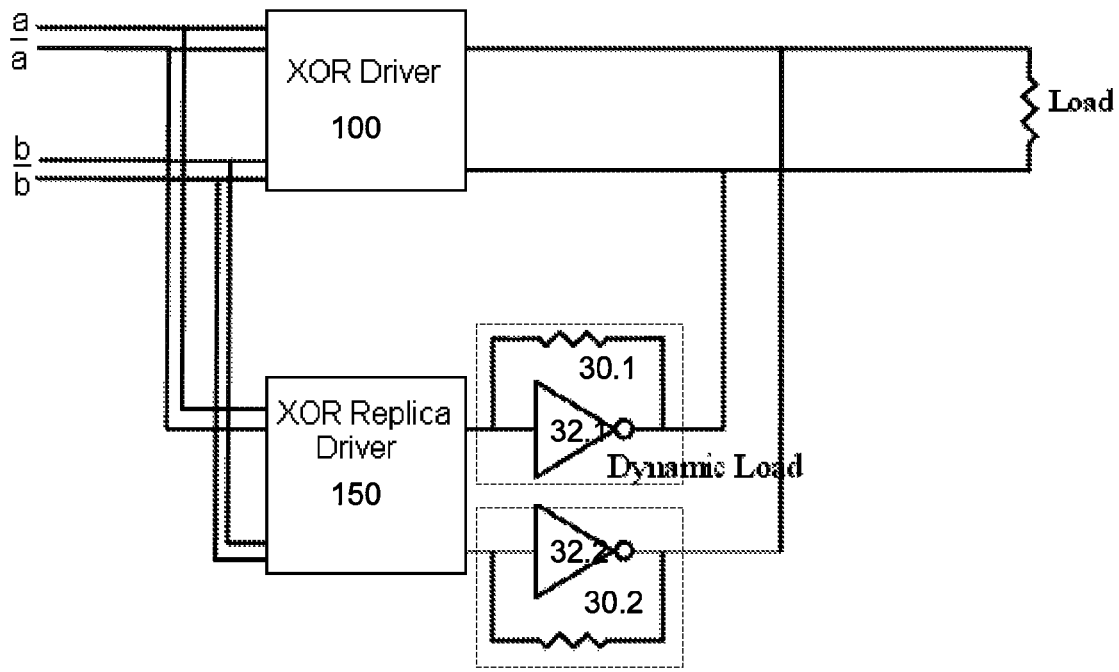
FIG. 10 is a diagram of a XOR driver in a serial transmitter in parallel with a dynamic impedance according to an embodiment of the present invention.

FIG. 10 illustrates a XOR driver in a serial transmitter in parallel with a dynamic impedance according to an embodiment of the present invention. The serial transmitter depicted in FIG. 10 may be similar to serial transmitter 10 in FIG. 1. The serial transmitter may include a XOR driver 100 that corresponds to the multiplexing XOR driver embodied in FIG. 2. The XOR driver 100 may be implemented in accordance with either the stacked architecture in FIG. 4 or the cross-coupled architecture in FIG. 5. The serial transmitter may also include a XOR replica driver 150 that may be configured identically to XOR driver 100. XOR replica driver 150 may drive the input for the dynamic impedances 30.1, 30.2.

As shown in FIG. 10, XOR driver 100 and the XOR replica driver 150 may each receive two pairs of inputs: a, b, and the inversion of those input signals, $\overline{a}$ and $\overline{b}$. XOR driver 100 may be connected in parallel to the dynamic impedances 30.1, 30.2.

Dynamic impedances 30.1, 30.2 may also allow for the reduction in the size of the nMOS devices in XOR driver 100 XOR replica driver 150, because the output impedance is set by the dynamic impedance and not the driver. The presence of dynamic impedance 30.1, 30.2, may allow for the input capacitance of serial transmitter 10 to be reduced.

Each of the dynamic impedances 30.1, 30.2, embodied in FIG. 10 may include an inverter 32.1, 32.2 that is connected at its input and output by a resistor. In an embodiment, inverter 32.1, 32.2, may be implemented with CMOS devices. The CMOS inverter may be scaled to a particular size to achieve the required output impedance. An input terminal of the CMOS inverter may be connected to a resistor, with the output terminal of the CMOS inverter being connected to the other end of the resistor.

The dynamic impedances 30.1 and 30.2 may be connected to the output of the XOR replica driver 150. XOR replica driver 150 may drive the dynamic loads 30.1 and 30.2.

Both of the dynamic impedances 30.1, 30.2, may be connected to the outputs of XOR driver 100. In an example embodiment, an output of the XOR driver 100 may be connected to the output of CMOS inverter 32.1 and to the other end of its connecting resistor. Another output of the XOR driver 100 may also be connected to the output of CMOS inverter 32.2 and to the other end of its connecting resistor. In an embodiment, the outputs of the XOR driver 100 may be connected to some external load.

Figure 11:
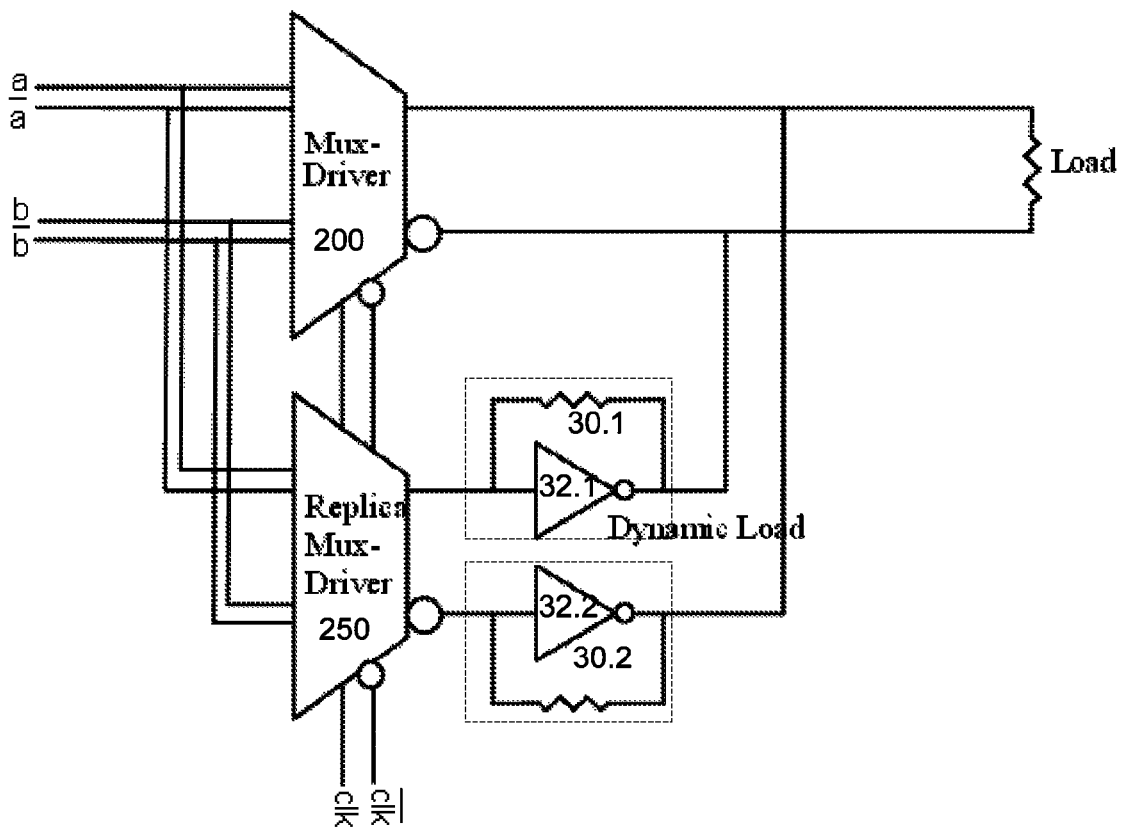
FIG. 11 is a diagram of a mux driver in a serial transmitter in parallel with a dynamic impedance according to an embodiment of the present invention.

FIG. 11 illustrates a diagram of a mux driver in a serial transmitter in parallel with a dynamic impedance according to an embodiment of the present invention. The serial transmitter depicted in FIG. 11 may be similar to serial transmitter 10 in FIG. 1. The serial transmitter may include a mux driver 200 that corresponds to the mux driver embodied in FIG. 6. The mux driver 200 may be implemented in accordance with either the stacked architecture in FIG. 8 or the cross-coupled architecture in FIG. 9. The serial transmitter may also include a replica mux driver 250 that may be configured identically to mux driver 200. Replica mux driver 250 may drive the input for the dynamic impedances 30.1, 30.2.

As shown in FIG. 11, mux driver 200 and the replica mux driver 250 may each receive two pairs of inputs: a, b, and the inversion of those input signals, $\overline{a}$ and $\overline{b}$. The mux driver 200 and replica mux driver 250 may be controlled by a clock, clk, and the inverted clock signal, $\overline{clk}$.

The mux driver 200 may be connected in parallel to the dynamic impedances 30.1, 30.2. Dynamic impedances 30.1, 30.2 may also allow for the reduction in the size of the nMOS devices in mux driver 200 and replica mux driver 250, because the output impedance is set by the dynamic impedance and not the driver. The presence of dynamic impedance 30.1, 30.2, may allow for the input capacitance of serial transmitter 10 to be reduced.

Each of the dynamic impedances 30.1, 30.2, embodied in FIG. 11 may include an inverter 32.1, 32.2 that is connected at its input and output by a resistor. In an embodiment, inverter 32.1, 32.2, may be implemented with CMOS devices. The CMOS inverter may be scaled to a particular size to achieve the required output impedance. An input terminal of the CMOS inverter may be connected to a resistor, with the output terminal of the CMOS inverter being connected to the other end of the resistor.

The dynamic impedances 30.1 and 30.2 may be connected to the output of the replica mux driver 250. Replica mux driver 250 may drive the dynamic loads 30.1 and 30.2.

Both of the dynamic impedances 30.1, 30.2, may be connected to the outputs of mux driver 200. In an example embodiment, an output of the mux driver 200 may be connected to the output of CMOS inverter 32.1 and to the other end of its connecting resistor. Another output of the mux driver 200 may also be connected to the output of CMOS inverter 32.2 and to the other end of its connecting resistor. In an embodiment, the outputs of the mux driver 200 may be connected to some external load.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A high speed serial transmitter comprising:
   at least one driver; and
   at least one dynamic impedance connected in parallel to the driver, the dynamic impedance comprising an inverter and a resistor connected to an input and an output of the inverter;
   wherein the driver and the dynamic impedance are contained in a single stage of the serial transmitter.

2. The serial transmitter according to claim 1, further comprising:
   an additional driver to drive the dynamic impedance.

3. The serial transmitter according to claim 1, wherein the driver is a XOR logic circuit that provides multiplexing functionality.

4. The serial transmitter according to claim 3, wherein the XOR logic circuit receives half bit rate inputs.

5. The serial transmitter according to claim 3, wherein the XOR logic circuit is configured in a stacked architecture.

6. The serial transmitter according to claim 3, wherein the XOR logic circuit is configured in a cross-coupled architecture.

7. The serial transmitter according to claim 1, wherein the driver is a multiplexer.

8. The serial transmitter according to claim 1, wherein the inverter is a CMOS inverter.

9. The serial transmitter according to claim 7, wherein the multiplexer receives half bit rate inputs.

10. The serial transmitter according to claim 7, wherein the multiplexer is configured in a stacked architecture.

11. The serial transmitter according to claim 7, wherein the multiplexer is configured in a cross-coupled architecture.

12. A high speed serial transmitter comprising:
    at least one driver;
    at least one dynamic impedance connected in parallel to the driver, the dynamic impedance comprising a CMOS inverter and a resistor connected to an input and an output of the inverter; and
    an inverter to drive the dynamic impedance;
    wherein the driver and the dynamic impedance are contained in a single stage of the serial transmitter.

13. A high speed serial transmitter comprising:
    a XOR driver receiving a pair of half bit rate inputs;
    at least one dynamic impedance connected in parallel to the XOR driver, the dynamic impedance comprising an inverter and a resistor connected to an input and an output of the inverter; and
    an additional XOR driver connected to the dynamic impedance, the additional XOR driver receiving the pair of half bit rate inputs and driving the dynamic impedance;
    wherein the XOR driver, the dynamic impedance, and the additional XOR driver are arranged in a single stage of the serial transmitter.

14. The serial transmitter according to claim 13, wherein the XOR driver comprises:
    at least one pMOS device operating as a current source; and
    a plurality of nMOS devices receiving the half bit rate inputs, the nMOS devices sinking current from the current source.

15. The serial transmitter according to claim 14, wherein the XOR driver is configured in a stacked architecture.

16. The serial transmitter according to claim 14, wherein the XOR driver is configured in a cross-coupled architecture.

17. The serial transmitter according to claim 13, wherein the additional XOR driver comprises:
    at least one pMOS device operating as a current source; and
    a plurality of nMOS devices receiving the half bit rate inputs, the nMOS devices sinking current from the current source.

18. The serial transmitter according to claim 17, wherein the additional XOR driver is configured in a stacked architecture.

19. The serial transmitter according to claim 17, wherein the additional XOR driver is configured in a cross-coupled architecture.

20. A high speed serial transmitter comprising:
    a multiplexer receiving a pair of half bit rate inputs, the multiplexer being selectably controlled by a clock;
    at least one dynamic impedance connected in parallel to the multiplexer, the dynamic impedance comprising an inverter and a resistor connected to an input and an output of the inverter; and
    an additional multiplexer connected to the dynamic impedance, the additional multiplexer receiving the pair of half bit rate inputs and driving the dynamic impedance;
    wherein the multiplexer, the dynamic impedance, and the additional multiplexer are arranged in a single stage of the serial transmitter.

21. The serial transmitter according to claim 20, wherein the additional multiplexer is selectably controlled by the clock.

22. The serial transmitter according to claim 20, wherein the multiplexer comprises:
    at least one pMOS device operating as a current source;
    a plurality of nMOS devices receiving the half bit rate inputs, the nMOS devices sinking current from the current source; and
    additional nMOS devices receiving the clock and an inverted clock as inputs.

23. The serial transmitter according to claim 22, wherein the multiplexer is configured in a stacked architecture.

24. The serial transmitter according to claim 22, wherein the multiplexer is configured in a cross-coupled architecture.

25. The serial transmitter according to claim 20, wherein the additional multiplexer comprises:
- at least one pMOS device operating as a current source;
- a plurality of nMOS devices receiving the half bit rate inputs, the nMOS devices sinking current from the current source; and
- additional nMOS devices receiving the clock and an inverted clock as inputs.

26. The serial transmitter according to claim 25, wherein the additional multiplexer is configured in a stacked architecture.

27. The serial transmitter according to claim 25, wherein the additional multiplexer is configured in a cross-coupled architecture.

* * * * *